United States Patent
Johnson et al.

(10) Patent No.: US 6,619,600 B1
(45) Date of Patent: Sep. 16, 2003

(54) BARBECUE GAS GRILL HAVING A WELDED FRAME ASSEMBLY

(75) Inventors: Mark Johnson, Wilmette, IL (US); J. Michael Alden, Palatine, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 09/637,657

(22) Filed: Aug. 11, 2000

(51) Int. Cl.[7] ................................................ A47K 1/04
(52) U.S. Cl. ..................... 248/129; 126/41 R; 126/25 R
(58) Field of Search ............................... 126/41 R, 9 R, 126/25 R, 276, 305; 248/129, 439, 250

(56) References Cited

U.S. PATENT DOCUMENTS

| | | | |
|---|---|---|---|
| 1,460,928 A | 7/1923 | Tilden | |
| 1,964,805 A | 7/1934 | Barnes | 126/268 |
| 2,055,564 A | 9/1936 | Tinnerman | 126/304 |
| 2,207,307 A | 7/1940 | Teller et al. | 126/39 |
| 2,447,925 A | 8/1948 | Vorbusch | 126/40 |
| 2,541,528 A | 2/1951 | McAvoy | 126/25 |
| 2,600,234 A | 2/1952 | Foley | 99/421 |
| 2,817,331 A | 12/1957 | Kaplan et al. | 126/41 |
| 3,586,518 A | 6/1971 | Folmar | 99/259 |
| 3,683,791 A | 8/1972 | Rast, Jr. | 99/340 |
| 3,877,765 A * | 4/1975 | Hassing | 312/257 |
| 4,362,093 A | 12/1982 | Griscom | 99/339 |
| 4,583,452 A | 4/1986 | Grosse | 99/427 |
| 4,635,613 A | 1/1987 | Tucker et al. | 126/25 R |
| 4,663,517 A | 5/1987 | Huff et al. | 219/404 |
| 4,677,964 A | 7/1987 | Lohmeyer et al. | 126/41 R |
| D293,067 S | 12/1987 | Stephen et al. | D7/334 |
| 4,823,684 A | 4/1989 | Traeger et al. | 99/447 |
| 4,886,045 A | 12/1989 | Ducate, Jr. et al. | 126/41 R |
| 4,896,652 A | 1/1990 | Geiter | 126/41 R |
| 4,924,846 A | 5/1990 | Peacock et al. | 126/41 R |
| 4,955,358 A | 9/1990 | Harris et al. | 126/25 R |

(List continued on next page.)

Primary Examiner—Ramon O. Ramirez
Assistant Examiner—A. Joseph Wujciak, III
(74) Attorney, Agent, or Firm—Wallenstein & Wagner, Ltd.

(57) ABSTRACT

The present invention-provides a welded-frame assembly of a barbecue gas grill, or an accessory cart. The frame assembly comprises a plurality of elongated support members and a plurality of elongated channel members having at least a portion of generally U-shaped cross section and including an inner welding surface and an outer cosmetic surface. The channel members are disposed transverse to the support members and arranged such that their ends abut against the support members. A plurality of weld joints are each disposed on the inner welding surface of the channel members and a portion of the support members. The weld joints provide attachment of the support members and the channel members to form the welded frame assembly without substantial discoloration of the outer cosmetic surfaces of the channel members. Furthermore, the weld joints are substantially concealed for aesthetic purposes.

23 Claims, 3 Drawing Sheets

U.S. PATENT DOCUMENTS

| | | | |
|---|---|---|---|
| D316,355 S | 4/1991 | Stephen et al. | D7/339 |
| 5,027,788 A | 7/1991 | Schlosser et al. | 126/25 R |
| 5,050,577 A | 9/1991 | Baynes et al. | |
| 5,056,364 A | 10/1991 | Kahler et al. | 73/296 |
| 5,070,776 A | 12/1991 | Schlosser et al. | 99/450 |
| 5,072,718 A | 12/1991 | Seal | 126/41 R |
| 5,076,252 A | 12/1991 | Schlosser et al. | 126/25 R |
| 5,076,256 A | 12/1991 | Raymer et al. | 126/41 R |
| 5,076,257 A | 12/1991 | Raymer et al. | 126/41 R |
| 5,109,834 A | 5/1992 | Collins et al. | 126/41 R |
| D327,390 S | 6/1992 | Schlosser et al. | D7/334 |
| 5,163,358 A | 11/1992 | Hanagan et al. | 99/339 |
| 5,203,317 A | 4/1993 | James | 126/41 R |
| 5,277,106 A | 1/1994 | Raymer et al. | 99/447 |
| 5,327,879 A | 7/1994 | Ferraro | 126/41 R |
| 5,341,793 A | 8/1994 | Brown | 126/41 R |
| 5,408,985 A | 4/1995 | Giebel et al. | 126/41 R |
| 5,483,947 A | 1/1996 | Giebel et al. | 126/41 R |
| 5,579,755 A | 12/1996 | Johnston | 126/41 R |
| D380,933 S | 7/1997 | Schlosser et al. | D7/334 |
| 5,655,792 A * | 8/1997 | Booher | 280/789 |
| D395,378 S | 6/1998 | Schlosser et al. | D7/403 |
| 5,765,469 A | 6/1998 | Schlosser et al. | 99/337 |
| D404,963 S | 2/1999 | Schlosser et al. | D7/334 |
| 5,873,355 A | 2/1999 | Schlosser et al. | 124/41 R |
| 5,934,183 A | 8/1999 | Schlosser et al. | 99/385 |
| 5,934,184 A * | 8/1999 | Schlosser et al. | 99/385 |
| 5,941,229 A * | 8/1999 | Schlosser et al. | 126/41 |
| 6,000,389 A | 12/1999 | Alpert | 126/25 R |
| 6,051,325 A * | 4/2000 | Talwar et al. | 428/593 |
| 6,085,859 A * | 7/2000 | Alderson | 180/377 |
| 6,109,052 A * | 8/2000 | Austin, Jr. | 62/259.1 |
| 6,209,775 B1 * | 4/2001 | McKibben | 228/138 |
| 6,257,229 B1 * | 7/2001 | Stewart et al. | 126/276 |
| 6,308,591 B1 * | 10/2001 | Dankow et al. | 74/588 |

\* cited by examiner

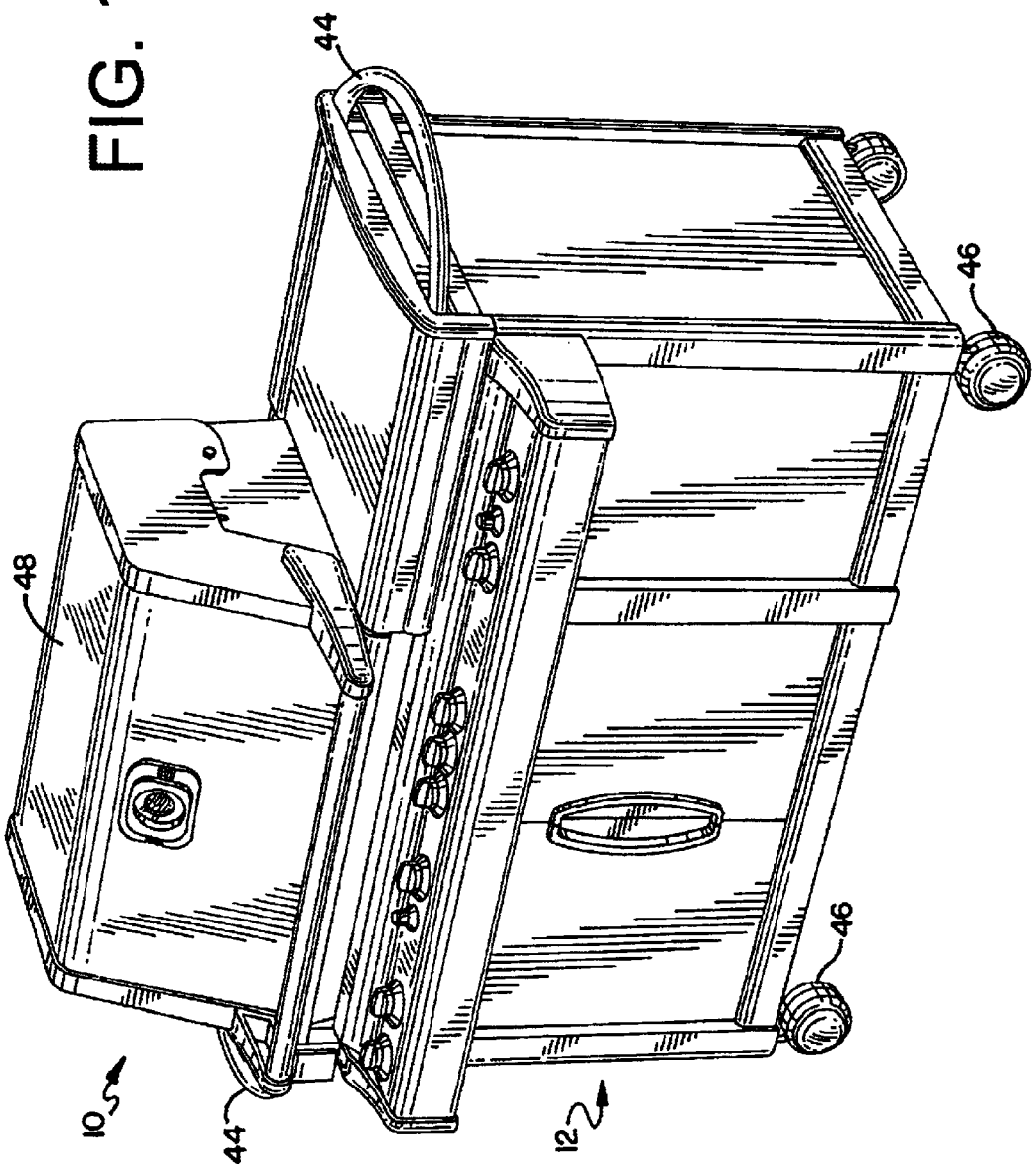

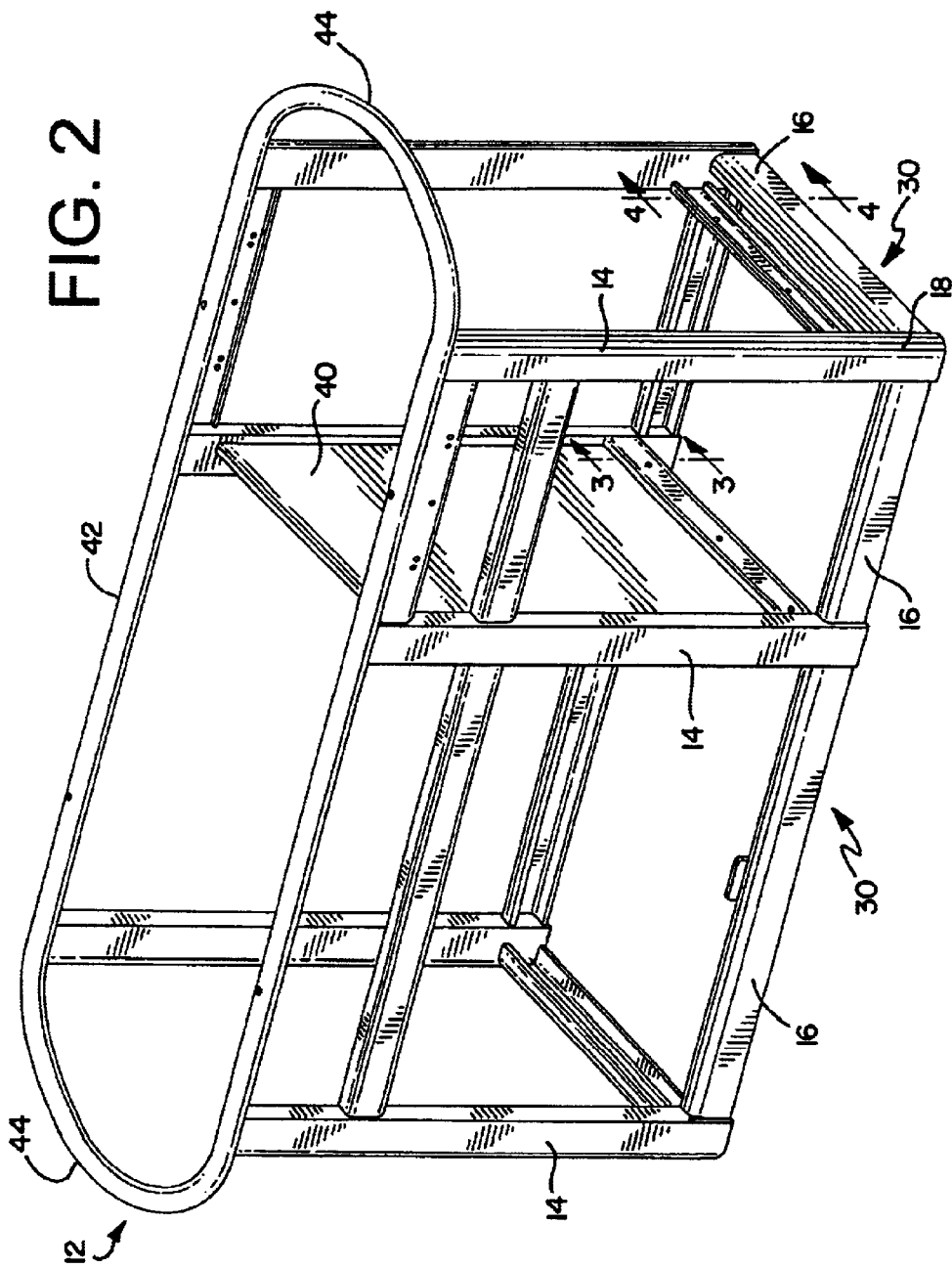

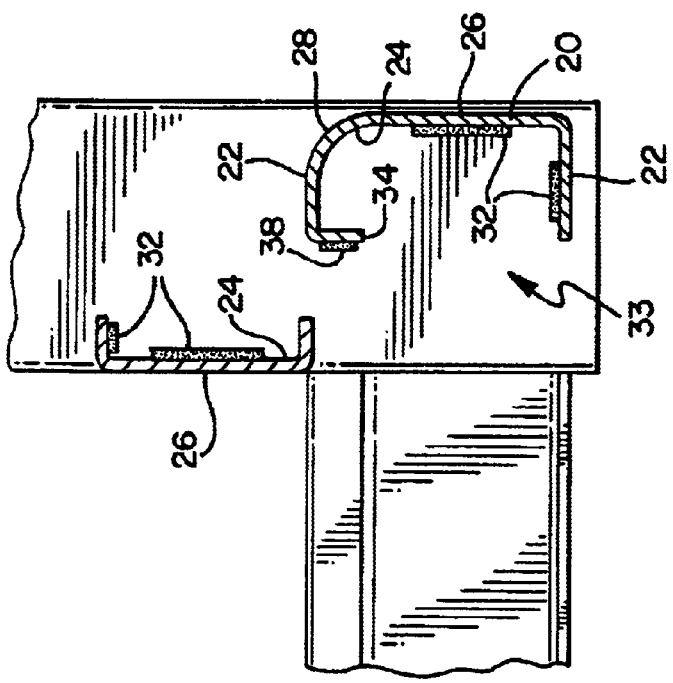
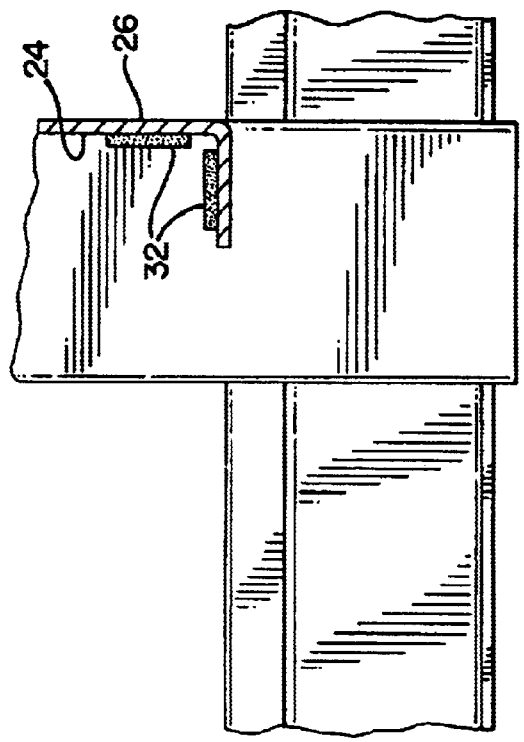

BARBECUE GAS GRILL HAVING A WELDED FRAME ASSEMBLY

TECHNICAL FIELD

The present invention relates generally to outdoor cooking devices, such as a barbecue grill, and more particularly to welded frame assemblies for larger-sized gas grills of stainless steel construction.

BACKGROUND OF THE INVENTION

Barbecue grills have become increasingly popular in recent years with increased popularity of outdoor cooking. Conventionally, gas grills consist of a cart or frame that supports a firebox. The gas grills include a burner assembly adjacent to a lower portion of the firebox and a cooking grid supported along the upper edge of the firebox. The firebox usually includes a hinged cover to create a cooking chamber. Other features are typically provided on the frame of the grill, such as work surfaces, storage cabinets, side burners, or the like, to create a more functional and convenient outdoor grill.

In recent years, various appliances having stainless steel construction or a stainless steel aesthetic appearance have become increasingly popular. The stainless steel construction has also become popular for gas grills. The frame assemblies for typical stainless steel grills include tube members or solid bar members welded together to form the frame. The tube members and bar members provide strength and rigidity to the frame to support and accommodate various features of the grill. However, tubular stainless steel components are very heavy and expensive. Furthermore, most of the weld joints of two adjoining tube members must be extensively sanded and "finished" to provide a more pleasing aesthetic appearance to the stainless steel frame. The extensive finishing process adds labor cost and also increases manufacturing cycle times. In contrast, non-stainless steel grill frames are typically painted to cover welded segments, or may be secured together with fasteners and connections generally unsuitable for heavier stainless steel frames and grill structures.

In response to the growing trend of stainless steel gas grill construction and the drawbacks of presently known stainless steel frame construction already described, there is a need to provide a stainless steel frame assembly that can be constructed from lighter-weight members that can be easily welded while not requiring extensive "finishing" or processing. There is also a need to provide such a frame construction while also providing a rigid and robust frame for proper support of the cooking chamber and various ancillary features of the grill.

The present invention satisfies these needs as well as providing other additional features and advantages over the prior art.

SUMMARY OF THE INVENTION

The present invention provides a welded frame assembly of a barbecue gas grill, or an accessory cart. The frame assembly comprises a plurality of elongated support members and a plurality of elongated channel members having at least a portion of generally U-shaped cross section and including an inner welding surface and an outer cosmetic surface. The channel members are disposed transverse to the support members and arranged such that their ends abut against the support members. A plurality of weld joints are each disposed on the inner welding surface of the channel members and a portion of the support members. The weld joints provide attachment of the support members and the channel members to form the welded frame assembly without substantial discoloration of the outer cosmetic surfaces of the channel members. Furthermore, the weld joints are substantially concealed for aesthetic purposes.

Other features and advantages of the invention will be apparent from consideration of the following specification and drawings.

BRIEF DESCRIPTION OF THE DRAWINGS

FIG. 1 is a perspective view of a barbecue gas grill incorporating an embodiment of a welded frame assembly according to the present invention.

FIG. 2 is a perspective view of the embodiment of the frame assembly utilized in the gas grill depicted in FIG. 1.

FIG. 3 is a partial cross-sectional view of a support member and a channel member taken along section lines 3—3 in FIG. 2.

FIG. 4 is a partial cross-sectional view of a support member and a channel member taken along section lines 4—4 in FIG. 2.

DETAILED DESCRIPTION OF THE PREFERRED EMBODIMENT

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

FIG. 1 depicts a barbecue gas grill 10 that incorporates a specific embodiment of the present invention in the form of a welded frame assembly 12. The frame assembly 12 is shown in FIG. 2. Referring to FIG. 2, the frame assembly 12 includes a plurality of structural members, shown as a plurality of vertically disposed elongated support members 14 and a plurality of horizontally disposed elongated channel members 16. However, any type of elongated structural member could be utilized in the present invention. In the specific embodiment shown in FIG. 2, it is to be understood that the support members 14 could also be horizontally disposed while the channel members 16 could be vertically disposed without departing from the invention. In a preferred embodiment, the support members 14 are rectangular tubes that have a rectangularly-shaped cross section. One or more corners of the support members 14 can be rounded, such as corner 18, which is shown in FIG. 2. In a preferred embodiment, the support members 14 are made of stainless steel and are fabricated by cold working methods.

In a preferred embodiment, the channel members 16 have at least a portion of generally U-shaped cross section. Alternatively, the channel members 16 may be of the same construction as the support members 14. In a preferred embodiment, the U-shape is formed by a portion of a middle section 20 and two side sections 22 disposed transverse to the middle section 20. The middle section 20 and the two side sections 22 each include inner welding surfaces 24 and an outer cosmetic surfaces 26, as shown in FIGS. 3 and 4. Each of the channel members 16 may differ slightly in size and shape, but are substantially similar in overall structure. For example, the larger of the two channel members 16 depicted in FIG. 4 has a rounded edge 28. The larger channel members 16 are preferably utilized along the bottom edges 30 of the frame assembly 12, as shown in FIG. 1. As a further example, the smaller of the two channel members 16 depicted in FIG. 4 may be utilized for attachment of drawer slides (not shown) thereto to accommodate a sliding drawer feature of the grill 10.

Each of the horizontally disposed channel members 16 is abutted against the support members 14 in a transverse relationship and welded thereto by a plurality of weld joints 32 positioned in contact with the inner welding surfaces 24 of the middle section 20 and two side sections 22 of the channel members 16, as shown in FIGS. 3 and 4. FIGS. 3 and 4 depict two typical points of engagement between the channel members 16 and support members 14 throughout the frame assembly 12. While other points of engagement may exist within the frame assembly 12, they are substantially similar to those shown in FIGS. 3 and 4. In one embodiment, the welded arrangements as disclosed herein are incorporated into the manufacture of at least two frame units, and the frame units are subsequently secured to one another by traditional means. Positioning the weld joints 32 in contact with the inner surfaces 24 of the channel members 16 prevents substantial blemishing of the outer cosmetic surfaces 26 of the channel members 16 due to heat from the welding process. Furthermore, since the welds are positioned on the inner surfaces 24 of the channel members 16, they are substantially concealed, thereby adding to the aesthetic quality of the grill 10. This is a significant advantage-over-conventional-welding techniques that weld the structural members around the outer periphery of the surfaces of two transversely engaged structural members.

An important feature of the present invention is the concealment of the weld joints 32 from the outer cosmetic surfaces 26 of the channel members 16, as well as the outer surfaces of the support members. This is carried out by placing the weld joints 32 on the inner surfaces 24 of the channel members 16. It is to be understood that the channel members 16 do not need to have a U-shaped cross section along their entire length, as long as there is an access opening at the ends adapted to expose a portion of the inner welding surfaces 24 to effectuate welding of the inner surface 24. Furthermore, a single type of structural member could be utilized in lieu of utilizing both the support members 14 and the channel members 16. Thus, in an alternate embodiment, a single tubular structural member (not shown) having access openings to an inner surface of the member can be utilized without departing from the present invention. Alternatively, the member could also be provided with a flange (not shown) that extends inwardly away from the cosmetic surfaces to accommodate one or more weld joints, potentially employing a spot weld.

In a preferred embodiment, one or more of the channel members 16 may include a flange 34 disposed along one of the side sections 22, as shown in FIG. 4. The flange 34 provides one or more additional welding surfaces 36 for additional weld joints, such as weld joint 38.

Referring to FIG. 1, the frame assembly 12 may also include one or more substantially flat panels 40 disposed between two support members 14 in a vertical plane to create enclosures around or within the frame assembly 12. The flat panel 40 may alternatively be disposed between two channel members 16 in a horizontal plane. The panels 40 may be attached to the support members 14 or the channel members 16 by weld joints (not shown), or by mechanical fasteners.

In a preferred embodiment, the frame assembly 12 includes a peripheral tubular bar member 42 attached to one end of each of the vertically disposed support members 14, as shown in FIG. 1. The bar member 42 can be attached to the support members 14 by weld joints (not shown), or mechanical fasteners (not shown). The bar member 42 includes handle portions 44 so that the grill 10 can be easily moved via casters 46, as shown in FIG. 1. The bar member 42 adds rigidity to the top portion of the frame assembly 12 and also provides support for a cooking chamber 48 of the grill 10.

In an alternate embodiment, the frame assembly 12 can be modular in design such that portions of the frame assembly can be pre-welded into larger structural components that can be welded together during final assembly. For example, the complete front portion or rear portion of the frame assembly 12 can be pre-welded to form a modular component.

The frame assembly 12 can also be utilized in a food service or cooking accessory cart (not shown). In this type of application, the frame assembly 12 is used to accommodate various features, such as cabinets, work surfaces, burner surfaces, or the like, except that it would not have a cooking chamber.

The frame assembly 12 essentially provides a robust welded structure particularly suitable for stainless steel applications. The weld joints are concealed and discoloration of the steel due to heat from the weld is minimized by the positioning of the weld joints on the inner surfaces of the members.

While the specific embodiments have been illustrated and described, numerous modifications come to mind without significantly departing from the spirit of the invention, and the scope of protection is only limited by the scope of the accompanying Claims.

What is claimed is:

1. A gas barbecue grill having welded frame assembly including at least one elongated first structural member and at least one elongated second structural member, the second structural member having an end abutted against the first structural member in a transverse relationship, the second structural member including an opening adjacent the end defining a channel, the channel being adapted to provide an exposed inner surface at the end abutted against the first structural member with a weldment located at the inner surface of the second structural member for securement to the first structural member.

2. A gas barbecue grill having welded frame assembly comprising a plurality of elongated vertically disposed structural members and a plurality of elongated horizontally disposed structural members having at least one end with a U-shaped cross section and abutting against one of the vertically disposed structural members in a transverse relationship, the U-shaped end of said at least one structural member including an inner surface accessible to effectuate welding of the structural members to each other on the inner surfaces of the U-shaped end.

3. A welded frame assembly for a barbecue gas grill comprising:
   a plurality of elongated vertically disposed support members; and
   a plurality of elongated horizontally disposed channel members having a middle section and two side sections disposed transverse to the middle section to form a generally U-shaped cross section, the middle section and the two side sections each including an inner welding surface and an outer cosmetic surface, each of the horizontally disposed channel members abutted against the support members and welded thereto by a plurality of weld joints positioned in contact with the inner welding surfaces of the middle section and two side sections of the horizontal channel members, the positioning of the weld joints preventing substantial blemishing of the outer cosmetic surfaces of the channel members;

wherein the plurality of channel members and support members are arranged to form the welded frame assembly that supports the cooking chamber of the grill.

4. The welded frame assembly of claim 3, wherein the plurality of vertically disposed support members are tubes that have generally rectangular-shaped cross sections.

5. The welded frame assembly of claim 3, wherein the frame assembly includes four vertically disposed tubes each defining a vertical corner of the frame assembly, the vertical corner being generally rounded.

6. The welded frame assembly of claim 5, further including casters attached to the other end of each of the four vertically disposed support members.

7. The welded frame assembly of claim 3, further including casters attached to one end of at least four of the vertically disposed support members.

8. The welded frame assembly of claim 3, further including a peripheral tubular bar member attached to one end of each of the vertically disposed support members.

9. The welded frame assembly of claim 3, further including at least one substantially flat panel disposed between two channel members and attached thereto.

10. The welded frame assembly of claim 3, further including at least one substantially flat panel disposed between two support members and attached thereto.

11. The frame assembly of claim 3, wherein the horizontally disposed channel members further include at least one flange that defines at least one additional welding surface.

12. A welded frame assembly for an accessory cart comprising:

a plurality of elongated vertically disposed support members; and a plurality of elongated horizontally disposed channel members having a middle section and two side sections disposed transverse to the middle section to form a generally U-shaped cross section, the middle section and the two side sections each including an inner welding surface and an outer cosmetic surface, each of the horizontally disposed channel members abutted against the support members and welded thereto by a plurality of weld joints positioned in contact with the inner welding surfaces of the middle section and two side sections of the horizontal channel members, the positioning of the weld joints preventing substantial blemishing of the outer cosmetic surfaces of the channel members;

wherein the plurality of channel members and support members are arranged to form the welded frame assembly that accommodates one or more cabinets and work surfaces.

13. The welded frame assembly of claim 12, further including at least one substantially flat panel disposed between two channel members and attached thereto.

14. The welded frame assembly of claim 12, further including at least one substantially flat panel disposed between two support members and attached thereto.

15. The welded frame assembly of claim 12, further including casters attached to one end of at least four of the vertically disposed support members.

16. A method of assembling a frame for a barbecue gas grill comprising the steps of:

providing a plurality of elongated support members;

arranging a plurality of elongated channel members having a generally U-shaped cross section and including an inner welding surface and an outer cosmetic surface transverse to the support members such that their ends are abutted against the support members;

welding the inner welding surface of the channel members to the support members such that the weldment is not readily visible on the outer cosmetic surfaces of the channel members.

17. A frame for an outdoor cooking apparatus, comprising;

a welded frame assembly having a plurality of elongated frame members with at least one first elongated frame member and at least one second elongated frame member, the second frame member having an outer cosmetic surface, a weldment region with a generally U-shaped wall and an inner weldment surface, said second frame member being positioned in transverse relation to said first frame member and adapted to be secured to the first frame member by a weldment at the inner surface of the second elongated frame member, the weldment not being readily visible on the outer cosmetic surface.

18. A welded frame assembly for a barbecue gas grill comprising:

a plurality of elongated support members;

a plurality of elongated channel members having a generally U-shaped cross section and including an inner welding surface and an outer cosmetic surface, each of the channel members disposed transverse to the support members and having their ends abutted against the support members; and a plurality of weld joints each disposed on the inner welding surface of at least one of the channel members and at least one of the support members, the weld joints attaching the support members and the channel members to form the welded frame assembly without substantial discoloration of the outer cosmetic surfaces of the channel members, the weld joints being substantially concealed when viewing the outer cosmetic surfaces.

19. The welded frame assembly of claim 18, wherein the support members are vertically disposed and the channel members are horizontally disposed within the frame assembly.

20. The welded frame assembly of claim 19, further including a tubular bar member attached to one end of each of the vertically disposed support members.

21. The welded frame assembly of claim 18, further including at least one substantially flat panel disposed between two channel members and attached thereto.

22. The welded frame assembly of claim 18, further including at least one substantially flat panel disposed between two support members and attached thereto.

23. The welded frame assembly of claim 18, the U-shaped channel members comprise a middle section and two side sections disposed transverse to the middle section and having an end extending therefrom to form the U-shape, each of the side sections having an inner welding surface and an outer cosmetic surface, at least one of the side sections further including a flange disposed along its extended end to create at least one additional welding surface.

* * * * *